Patented Oct. 14, 1952

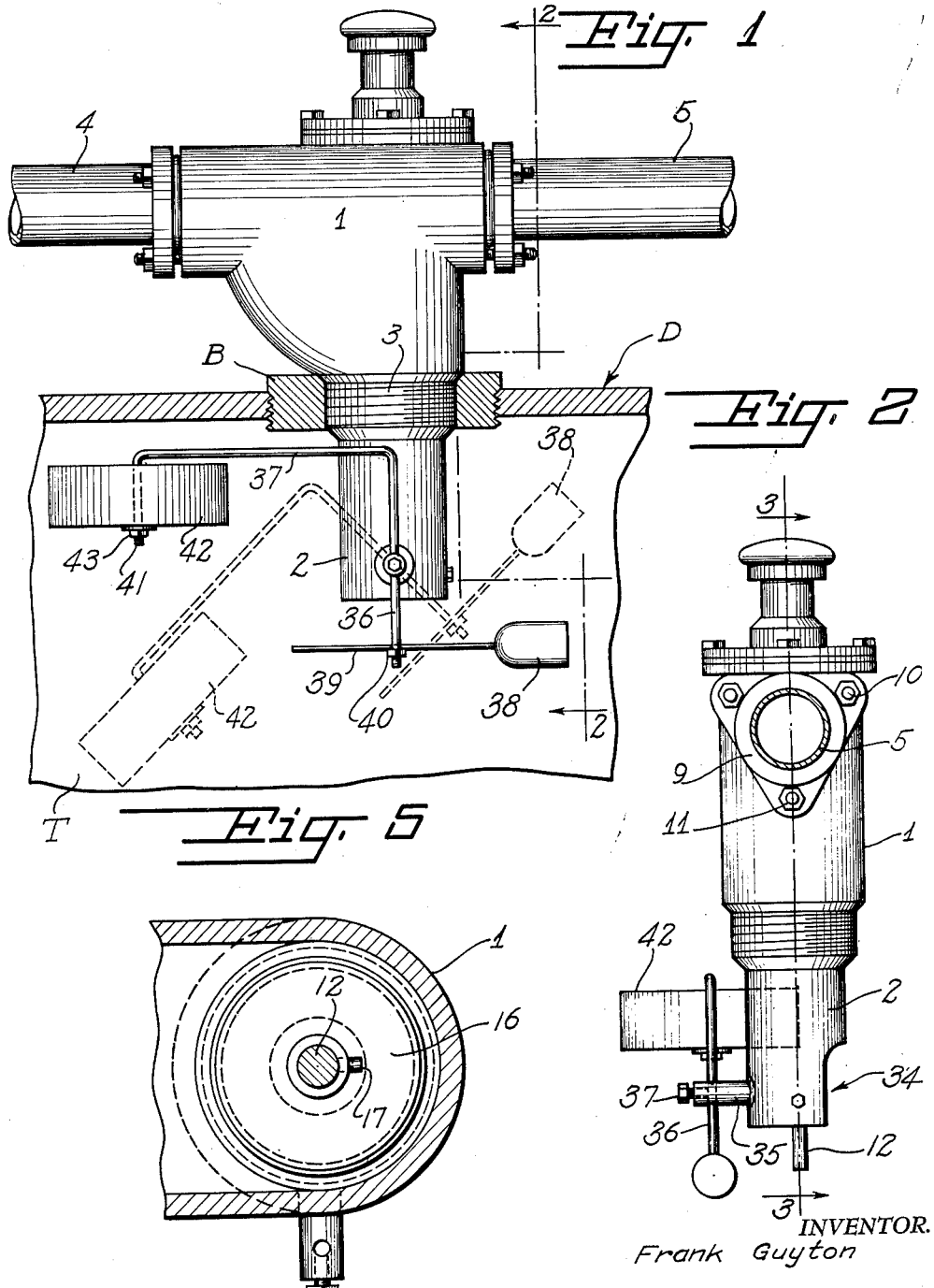

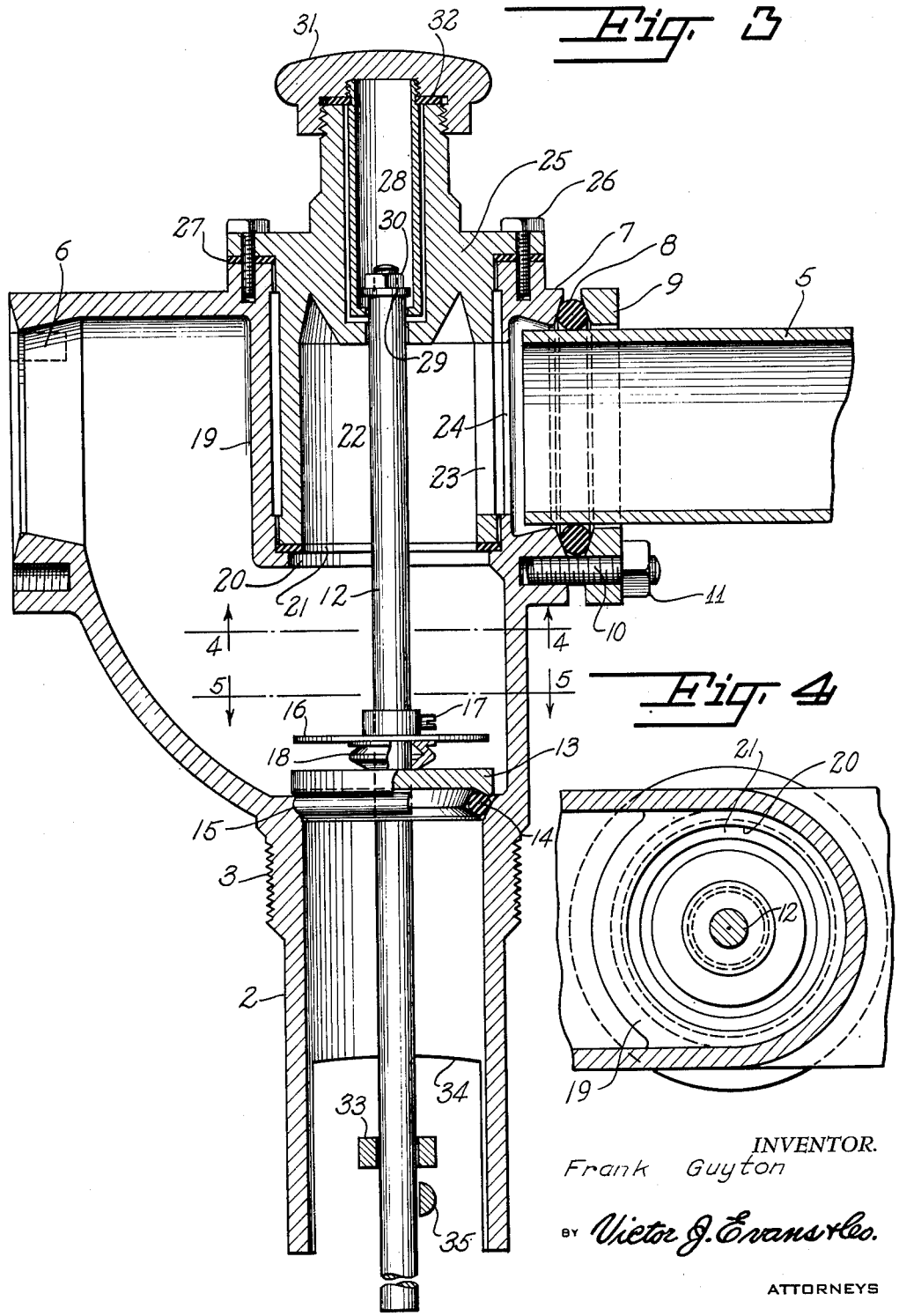

2,613,684

UNITED STATES PATENT OFFICE 2,613,684

OIL ROUTING VALVE

Frank Guyton, Sperry, Okla.

Application October 20, 1948, Serial No. 55,554

1 Claim. (Cl. 137—121)

My present invention relates to the general class of liquid distribution, and more specifically to an improved oil routing valve which, while well adapted for controlling various liquids and fluent streams or currents, is especially designed for use in oil fields for routing, diverting, or switching the flow oil from a well and depositing the flowing oil in a succession or battery of field storage tanks. In actual practice the successive tanks are connected with a main pipe line for conveying the oil, and each tank is equipped with an oil routing mechanism by means of which that tank is filled with oil and then automatically closed; and the flow of oil is then continued through the flow line to the next succeeding tank, until the last tank in the battery is filled and the flow line is closed.

In carrying out my invention each tank in a battery is equipped with a reciprocable, manually set and alternately seated, float controlled dual mechanism including a filling plug valve for the tank and a disk valve for the oil supply in the flow line.

The invention consists in certain novel features of construction and combinations and arrangements of parts as will hereinafter be described and more particularly set forth in the appended claim.

In the accompanying drawings I have illustrated a complete example of a physical embodiment of my invention in which the parts are combined and arranged in accord with one mode I have devised for the practical application of the principles of the invention. It will however be understood that changes and alterations are contemplated and may be made in these exemplifying drawings and mechanical structures within the scope of my claim without departing from the principles of the invention.

Figure 1 is a view in side elevation showing an embodiment of my invention with the valve device mounted on the deck of an oil tank.

Figure 2 is an end elevation as at the section line 2—2 of Fig. 1. Figure 3 is an enlarged vertical sectional view at line 3—3 of Fig. 2.

Figure 4 is a transverse sectional view at line 4—4 of Fig. 3; and Figure 5 is a similar view at line 5—5 of Fig. 3.

In order that the general arrangement and utility of parts may readily be understood I have shown in Fig. 1 the upper deck portion D of one of a battery of field storage tanks T equipped with a coupling or joint collar B having threaded connection with the deck D of the tank.

The valve mechanism is mounted in a valve casing 1 fashioned with an open bottom nozzle 2 depending within the interior of the tank, and threaded at 3 into the coupling B.

The valve casing is interposed within the oil flow line from the well which includes an inlet pipe section 4 to the casing and an outlet pipe section 5 from the casing to the valve mechanism of the next tank in the battery, and these alined pipe sections communicate with a flanged intake port 6 and a flanged outlet port 7 of the casing. The pipe sections are coupled with and seated in the ports by means of annular sealing gaskets or packing rings 8 of resilient material which expand and contract with the joint to insure a liquid tight coupling. The packed coupling joint is clamped to the casing by an annular flange or flanged ring 9 and threaded stud bolts 10 with clamp nuts 11.

A manually set and float controlled reciprocable valve rod 12 is mounted in upright position within the valve casing, and a tank filling plug valve or disc 13 having an annular seat ring 14 controls admission of oil from the casing through a complementary valve seat 15 located at the upper end of the nozzle 2. A cut off supply valve 16 of the disk type is also adjustably mounted on the rod and fixed in adjusted position by a set screw 17, and between the two valves is interposed an accordion pleated washer or collar 18 of resilient material that forms a pressure spring to hold the disk valve in its seat when closed.

For filling the tank with flow of oil from the interior of the casing, the cut off supply valve 16 is closed and the tank filling valve 13 is opened, and these valves are initially located in these positions by manually lifting the valve rod and the two valves mounted thereon. After the rod has been manually uplifted it is automatically supported by a float controlled trigger or detent device, and when the tank is filled to a predetermined level the float control mechanism releases the trigger or detent thereby permitting the rod and valves to drop, and thus close the tank filling valve and open the cut off supply valve.

The upper portion of the valve casing is provided with a bonnet structure that is mounted in an integral depending bushing 19 of the casing which is provided with an open bottom seat 20 for the disk valve 16 that seats against a packing ring 21 of the valve seat. The valve bonnet is provided with an open bottom cylindrical sleeve 22 fitted within the bushing 19, and this sleeve is provided with an outlet port 23 alined with a port 24 in the bushing 19, and both ports are alined with the outlet port 7 to the outlet pipe 5, in order that the oil may flow from one pipe section to the other pipe section when the valves are located as shown in Fig. 3.

The bonnet structure is fashioned with an integral tubular head 25 having flanges for attachment by bolts 26 to the flanged opening of the valve casing, and the interior sleeve of the bonnet is sealed by a ring or gasket 27 to prevent waste of oil.

The upper end of the valve rod 12 projects into the tubular head of the bonnet and through the open flanged end of a lifting tube 28 mounted within the head, and a retaining washer 29, larger in diameter than the open end of the flanged tube, is secured on the reduced threaded end of the valve rod by a nut 30. At its upper end the lifting tube is permanently threaded in a socket at the underside of a lifting knob or handle 31, and the knob is detachably screwed upon external threads of the bonnet head, a packing ring or gasket 32 being employed to seal the joint. For setting the valves, the knob may be unscrewed from the bonnet and through the medium of the lifting tube the knob is used to manually lift the valve rod, which is guided by a guide ring or collar 34 arranged transversely in and integral or rigid with the nozzle 2.

The lower end of the nozzle is cut away as at 34 to permit easy access to the interior of the nozzle, and within the nozzle, below the guide ring or collar, a half round oscillatable trigger or detent 35 is employed for coaction of its flat face with the lower end of the rod in holding the rod and valves in uplifted position. The partially rotatable or oscillatable detent or trigger 35 is journaled transversely of the nozzle in a rigid bearing and means are provided for preventing accidental longitudinal displacement of the detent, while its outer end projects through the side wall of the nozzle where it is fashioned with a transverse socket to receive an arm 36 that is clamped to the detent by set screw or bolt 37.

The arm 36 forms the fulcrum arm of an angular lever 37 and the fulcrum arm is provided with a weight 38 having its stem 39 adjustably mounted on the fulcrum arm and secured thereto by bolt 40.

The arm 37 of the angle lever has a downturned end 31 passed through a central bore of a glass float, 42, and a nut and washer 43 are used to secure the counterbalanced float on the lever end.

As indicated by dotted lines in Fig. 1, when the level of oil in the tank reaches a predetermined height, the float rocks the detent to release the supported valve rod and the weight aids in swinging the trigger mechanism free from the rod, thereby permitting the valves to drop under fluid pressure to close the tank filling valve and open the supply valve.

The packing rings, gaskets, and valve seats are fashioned of suitable material that will resist and prevent corrosion and insure durable joints, while the use of stainless steel in the cut off supply valve and other parts, and glass in the counterbalanced float, provide durable devices that may readily be serviced and maintained in excellent working condition.

Having thus fully described my invention, what I claim as new and desire to secure by Letters Patent is:

In an oil routing mechanism, a casing provided with an open bottom nozzle, there being an intake port and an outlet port in said casing, a valve seat arranged on the upper end of said nozzle, a vertically disposed rod reciprocably mounted in said casing, a horizontally disposed disc carried by said rod and mounted for movement into and out of engagement with said valve seat, a bonnet structure mounted on the upper end of said casing and provided with a bottom seat, a horizontally disposed supply valve mounted on said rod and mounted for movement into and out of engagement with said bottom seat, an accordion pleated collar interposed between said disc and supply valve, a tubular head arranged on said bonnet structure and connected to said casing, a lifting tube arranged in said head and connected to said rod, a handle connected to the upper end of said lifting tube, a trigger arranged in engagement with the lower end of said rod, a lever connected to said trigger for moving the latter, a glass float connected to one end of said lever, and a counterbalancing weight mounted on the other end of said lever.

FRANK GUYTON.

REFERENCES CITED

The following references are of record in the file of this patent:

UNITED STATES PATENTS

| Number | Name | Date |
|---|---|---|
| 99,762 | Cushing | Feb. 15, 1870 |
| 947,801 | Cooper | Feb. 1, 1910 |
| 1,551,683 | Muchnic | Sept. 1, 1925 |
| 1,736,933 | Morgan | Nov. 26, 1929 |
| 2,018,169 | Williams | Oct. 22, 1935 |
| 2,084,698 | Mollet | June 22, 1937 |

FOREIGN PATENTS

| Number | Country | Date |
|---|---|---|
| 224,865 | Germany | Aug. 3, 1910 |